US009189614B2

(12) United States Patent
DeLuca (10) Patent No.: US 9,189,614 B2
(45) Date of Patent: Nov. 17, 2015

(54) PASSWORD ENTRY FOR DOUBLE SIDED MULTI-TOUCH DISPLAY

(71) Applicant: International Business Machines Corporation, Armonk, NY (US)

(72) Inventor: Lisa Seacat DeLuca, Baltimore, MD (US)

(73) Assignee: GLOBALFOUNDRIES, INC., Grand Cayman (KY)

( * ) Notice: Subject to any disclaimer, the term of this patent is extended or adjusted under 35 U.S.C. 154(b) by 137 days.

(21) Appl. No.: 14/033,616

(22) Filed: Sep. 23, 2013

(65) Prior Publication Data

US 2015/0089634 A1   Mar. 26, 2015

(51) Int. Cl.
| G06F 21/36 | (2013.01) |
| G06F 3/0488 | (2013.01) |
| G06F 21/32 | (2013.01) |

(52) U.S. Cl.
CPC .............. *G06F 21/36* (2013.01); *G06F 3/0488* (2013.01); *G06F 21/32* (2013.01)

(58) Field of Classification Search
CPC ..... G06F 3/03547; G06F 21/32; G06F 21/36; G06F 3/0488
See application file for complete search history.

(56) References Cited

U.S. PATENT DOCUMENTS

| 7,969,405 B2 | 6/2011 | Kwan |
| 8,263,968 B2 | 9/2012 | Kwok et al. |
| 8,363,020 B2 | 1/2013 | Li et al. |
| 2009/0085877 A1 | 4/2009 | Chang et al. |
| 2009/0210939 A1* | 8/2009 | Xu et al. .......................... 726/19 |
| 2009/0313693 A1 | 12/2009 | Rogers |
| 2010/0031200 A1 | 2/2010 | Chen |
| 2010/0188353 A1* | 7/2010 | Yoon et al. ..................... 345/173 |

(Continued)

FOREIGN PATENT DOCUMENTS

| EP | 2260429 A2 | 12/2010 |
| WO | 2010121031 A1 | 10/2010 |

OTHER PUBLICATIONS

Erh-Li Early Shen et al, Double-side Multi-touch Input for Mobile Devices, Extended Abstracts on Human Factors in Computing Systems, 2009, USA, pp. 4339-4344.

(Continued)

*Primary Examiner* — Koosha Sharifi-Tafreshi
*Assistant Examiner* — Chun-Nan Lin
(74) *Attorney, Agent, or Firm* — Patrick J. Daugherty; Driggs, Hogg, Daugherty & Del Zoppo Co., LPA (57) ABSTRACT

Password definition and recognition in programmable devices with back-to-back transparent, touchscreens includes defining first and second contact patterns on respective first and second ones of the touchscreens as patterns of touchscreen contact inputs generated from contact of respective contact elements on the touchscreens contemporaneously, wherein the touchscreens enable a viewer to see through the touchscreens. A composite password pattern is defined by mapping location of the first pattern on the first screen relative to the location of the second pattern on the second screen. Recognizing a successful entry of the composite password pattern requires an entry of the first pattern on one of first and second, back-to-back touchscreens contemporaneously with an entry of the second pattern on another of the first and second touchscreens in an alignment that is compliant with the composite password mapping.

20 Claims, 4 Drawing Sheets

(56) References Cited

U.S. PATENT DOCUMENTS

| | | |
|---|---|---|
| 2010/0328191 A1 | 12/2010 | Smith et al. |
| 2011/0163986 A1* | 7/2011 | Lee et al. .................. 345/173 |
| 2011/0273409 A1 | 11/2011 | Lee et al. |
| 2012/0182125 A1* | 7/2012 | Cao .......................... 340/5.85 |
| 2012/0256886 A1 | 10/2012 | Ryu et al. |
| 2012/0327009 A1 | 12/2012 | Fleizach |
| 2013/0234836 A1 | 9/2013 | Davis |
| 2014/0009415 A1* | 1/2014 | Nishida .................... 345/173 |

OTHER PUBLICATIONS

ISA-EP International Search Report Dated Sep. 4, 2014 re PCT Application PCT/EP2014/061274, filed May 30, 2014.

* cited by examiner

PASSWORD ENTRY FOR DOUBLE SIDED MULTI-TOUCH DISPLAY

FIELD OF THE INVENTION

The present invention relates to mechanisms for password protection of programmable devices having multiple touch-screen displays.

BACKGROUND

Programmable computing devices may provide touchscreen components. A touchscreen is an electronic visual display that a user can receive inputs through contact with the surface of the touchscreen, such as by touching the screen with one or more fingers. Some touchscreens can also detect and recognize inputs from other objects such as a stylus, ordinary or specially coated gloves, etc. A user can use the touchscreen to select items displayed on the screen, and thereby initiate actions such as navigating to a displayed hyperlink reference by automatically invoking a browser routine, or controlling how content is displayed by invoking zooming or repositioning routines.

Touchscreens enable users to interact directly with displayed content and thereby provide inputs and selection data to the programmable device without requiring the use of a mouse, touchpad or other intermediate input device.

BRIEF SUMMARY

In one aspect of the present invention, a method for password definition and recognition in programmable devices with back-to-back touchscreens includes defining a first contact pattern as a pattern of touchscreen contact inputs generated from contact of a first contact element on a first touchscreen of a programmable device dual-touchscreen assembly that has a second touchscreen located back-to-back with the first touchscreen. A second contact pattern is defined as a pattern of touchscreen contact inputs that are generated from contact of a second contact element on the second touchscreen contemporaneously with the pattern of touchscreen contact inputs generated from contact of a first contact element on a first touchscreen, wherein the first and second touchscreens are transparent and enable a viewer to see through each of the first and second touchscreens in the dual-touchscreen assembly. A composite password pattern is defined by mapping location of the first pattern on the first screen relative to location of the second pattern on the second screen. Recognizing a successful entry of the composite password pattern requires an entry of the first pattern on one of first and second, back-to-back touchscreens contemporaneously with an entry of the second pattern on another of the first and second touchscreens in an alignment that is compliant with the composite password mapping.

In another aspect, a system has a processor, computer readable memory and a computer-readable storage medium with program instructions. The processor, when executing the stored program instructions, defines a first contact pattern as a pattern of touchscreen contact inputs generated from contact of a first contact element on a first touchscreen of a programmable device dual-touchscreen assembly that has a second touchscreen located back-to-back with the first touchscreen. A second contact pattern is defined as a pattern of touchscreen contact inputs that are generated from contact of a second contact element on the second touchscreen contemporaneously with the pattern of touchscreen contact inputs generated from contact of a first contact element on a first touchscreen, wherein the first and second touchscreens are transparent and enable a viewer to see through each of the first and second touchscreens in the dual-touchscreen assembly. A composite password pattern is defined by mapping the location of the first pattern on the first screen relative to the location of the second pattern on the second screen. Recognizing a successful entry of the composite password pattern requires an entry of the first pattern on one of first and second, back-to-back touchscreens contemporaneously with an entry of the second pattern on another of the first and second touchscreens in an alignment that is compliant with the composite password mapping.

In another aspect, a computer program product for password definition and recognition in programmable devices with back-to-back touchscreens has a computer-readable storage medium with computer readable program code embodied therewith. The computer readable program code includes instructions that, when executed by a processor, cause the processor to define a first contact pattern as a pattern of touchscreen contact inputs generated from contact of a first contact element on a first touchscreen of a programmable device dual-touchscreen assembly that has a second touchscreen located back-to-back with the first touchscreen. A second contact pattern is defined as a pattern of touchscreen contact inputs that are generated from contact of a second contact element on the second touchscreen contemporaneously with the pattern of touchscreen contact inputs generated from contact of a first contact element on a first touchscreen, wherein the first and second touchscreens are transparent and enable a viewer to see through each of the first and second touchscreens in the dual-touchscreen assembly. A composite password pattern is defined by mapping the location of the first pattern on the first screen relative to the location of the second pattern on the second screen. Recognizing a successful entry of the composite password pattern requires an entry of the first pattern on one of first and second, back-to-back touchscreens contemporaneously with an entry of the second pattern on another of the first and second touchscreens in an alignment that is compliant with the composite password mapping.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium excludes transitory, propagation or carrier wave signals or subject matter and includes an electronic, magnetic, optical or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that does not propagate but can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic or optical forms or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flowchart and/or block diagram block or blocks.

Some programmable devices provide a dual-touchscreen panel structures with two display panels. Aspects of the present invention provide for enhanced password definition and entry processes and systems for programmable devices that incorporate back-to-back touchscreens with transparent setting capabilities. Such devices provide a dual-touchscreen panel structure with two display panels mounted next to each other and facing outward respectively in a sandwich structure. Adjustable brightness settings may render each panel transparent so that both panels are visible when viewed through either panel. Thus, a user may see through the dual-touchscreen panel structure as one sees through a pane of glass, seeing both front and back sides simultaneously as is conveyed by the views of FIGS. 3A, 3B, 3C, 4, 7A and 7B, which are each more fully discussed below.

Figure 1:
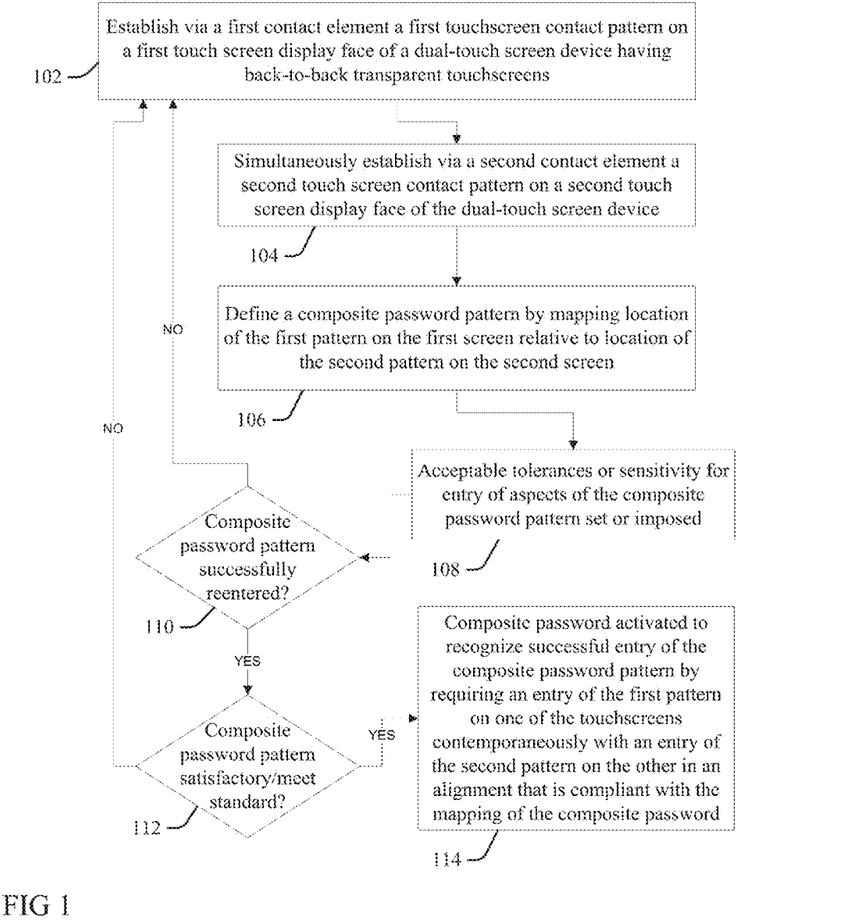
FIG. 1 is a flow chart illustration of an aspect according to the present invention for password definition and recognition in programmable devices with back-to-back transparent touchscreens.

FIG. 1 illustrates an aspect of the present invention for password definition and recognition in programmable devices with back-to-back touchscreens when the screens are set to be transparent so that a viewer is enabled to see through each of the screen surfaces to visually align elements located on either side of the dual-screen assembly and engaging the respective touchscreens. At 102 a first touchscreen contact pattern is performed or established via a first contact element on a first touchscreen display face of the dual-touchscreen assembly. At 104 a second contact pattern is contemporaneously (simultaneously in time) performed or established on the second touchscreen display face via a second contact element. More particularly, in some aspects, the transparent settings of the first and second touchscreens enable a viewer to see through each of the first and second touchscreens in the dual-touchscreen assembly to visually align the first and second elements located on either side of the assembly of the first and second touchscreens.

At 106 a composite password pattern is defined by mapping a location of the first pattern established on the first screen relative to a location of the second pattern established on the second screen. In some aspects, the composite pattern is mapped over a password setting time period, which enables the definition of dynamic composite patterns wherein different parts of a touchscreen surface are engaged over different time periods during the setting time period, for example when all or part of touch elements are not continuously resting on the surface of the touchscreen. Thus, the patterns established simultaneously on the first screen at 102 and the second screen at 104 are held (in the case of a static, unchanging pattern) or executed (in the case of a moving, changing or otherwise dynamic pattern) to define a composite password pattern as a combination of the established first and second screen patterns.

In some aspects, the mapping is a spatial relationship of the patterns with respect to each other, which may be readily repeated or described as alignments or orientations of the contact elements with respect to each when viewed through the transparent first and second screens. The mapping may also be time dependent and location independent with respect to aligning the entry of specific elements or portions of the patterns with respect to each other; for example, the composite pattern may require finger taps on respective ones of the screens that match in time or screen position mappings during entry of the composite pattern, and which are independent of times of execution of other elements of the composite pattern.

At 108 acceptable tolerances or sensitivity for entry of aspects of the composite password pattern may be set as preferences by a user, or imposed by a system processor. The tolerances set at 108 define the requisite accuracy in repeating the pattern for successful password entry. At 110 the defined composite password pattern is repeated on the dual touchscreens by the user or otherwise entered (for example, by a different user) to verify that entry of the composite password pattern within the sensitivity specified at 108 is possible. This step confirms that the defined password pattern is duplicable at the specified sensitivity level and therefore appropriate for use as a password. Entry of the composite password pattern at 110 may require execution over a confirmation time period that is the same or different from a password setting time period. If the composite password pattern is not successfully reentered at 110, then the process returns to 102 to redefine the composite password pattern.

At 112 the user, system, administrator, etc. verifies or otherwise confirms the composite pattern is satisfactory. For example, the user confirms satisfaction with the composite pattern, a system processor or administrator verifies that it meets some threshold standard such as not replicating an older, aged-out composite pattern, or is not the same or too similar to another known or stored user password, etc. If satisfaction is confirmed at 112, at 114 the user activates the composite password pattern, wherein subsequent use of the device after lock-out by the user (or via inactivity or power down, etc.) or other event that requires a password entry will require entry of the patterns on each of the first and second touchscreens that map to each other as defined by the composite password pattern determined at 106 via touchscreen inputs, and said inputs and pattern must be in compliance with tolerances or sensitivity defined at 108.

The contact patterns established at 102 or 104 may be defined by or associated with specific hand shapes having semantic meanings or identifications. For example, a user might hold a hand in a conventional shape or pattern while contact is established with a touchscreen to define a password pattern at 102 or 104 that is easy to remember, and also readily describable to other users by reference of a name or shape description. This enables the user or other person to remember and execute the pattern at a subsequent date, via reference to the name or description of the shape used to create the password pattern defined at 102 or 104.

Figure 2:
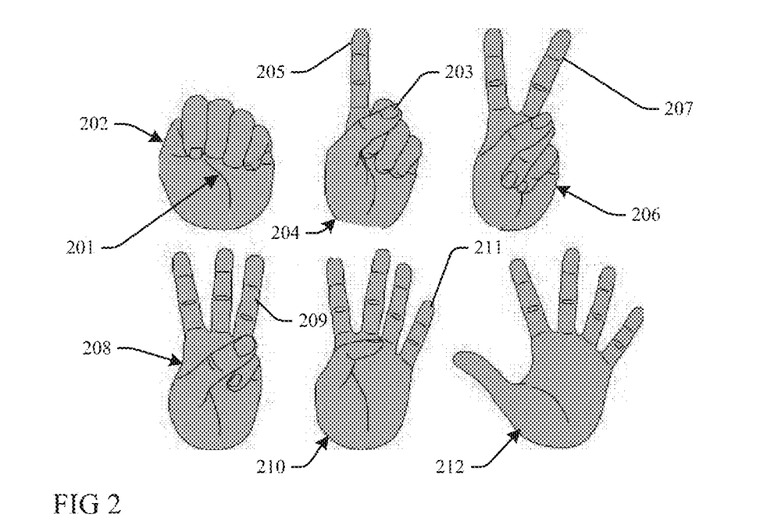
FIG. 2 provides graphic illustrations of hand positions and patterns that may be used to define a password pattern in aspects of the present invention.

FIG. 2 illustrates some examples of hand positions and patterns that may be used to define a password pattern at 102 or 104 via contact with the touchscreens. The shapes have semantic meanings useful in remembering the pattern components, or in describing them to others to recreate the patterns without the necessity of seeing the patterns themselves. For example, the shape 202 has all fingers 205, 207, 209 and 211, and thumb 203 curled into the palm area 201 and may be conventionally labeled or described as a "fist" or "zero" shape. The "number one" shape 204 has a single, index finger 205 extended from the palm 201 with the thumb 203 and the other three fingers 207, 209 and 211 all curled into the palm 201. The "number two" or "peace sign" shape 206 has the index finger 205 and middle finger 207 extended from the palm 201, with the thumb 203 and the other fingers 209 and 211 curled into the palm 201. The "number three" shape 208 has the index finger 205, middle finger 207 and ring finger 209 extended from the palm 201, with the thumb 203 and the other finger 211 curled into the palm 201. The "number four" shape 210 has four fingers 205, 207, 209 and 211 extended from the palm 201, with the thumb 203 curled into the palm 201. The "number five" or "high five" shape 212 has all fingers 205, 207 209 and 211 and thumb 203 extended from the palm 201. Still other hand positions may be practiced to generate contact patterns on the face or engaged touchscreens, and as will be appreciated by one skilled in the art.

Thus, a composite pattern password created by holding the "number three" shape 208 against the first screen at 102, simultaneously with holding the "high five/number five" shape 212 against the second screen at 104 for the password setting time period of 106 may be remembered by the user as a "35" password, with the ordering of the numbers "35" in the description indicating which touchscreen requires which of the number shapes 208 and 212 (the first screen gets a contact pattern from the "3" shape, and the second from the "5" shape). The user may also quickly and easily describe the composite password pattern to another user by referring to the password as "35," if the other user understands the shapes that each of the numbers 3 and 5 refer to, and the respective first and second screen associations conveyed by the ordering of the numbers.

The composite password contact patterns established at 102/104/106 may be static, for example by holding each shape unvarying against the respective first and second touchscreens during a password setting time period at 106. Alternatively, they may be dynamic patterns, defined by variations in contact point inputs over time during the password setting time period at 106 caused by moving user hands over the touchscreens, or otherwise differentially contacting the touchscreens, during a password setting time period at 106.

Dynamic and changing contact patterns may be established at 102 or 104 over time by tapping, pinching, squeezing, sliding and touching movements, and still other suitable dynamic pattern movements will be apparent to one skilled in the art. Thus, finger swipe motions in a sequential series of different swipes or screen touch point inputs may define specific patterns, such as a downward diagonal fingertip swipe to a left bottom corner, followed by an upward swipe along the left side of the screen by the same fingertip, etc.

Specific repeatable characters (letter, number, etc.) image patterns (arc, circle or other geometric shape; icons, a heart, hieroglyphic images, etc.) or other semantically meaningful patterns may also be drawn during the password setting time period at 106 to define dynamic contact password pattern components on either of the dual touchscreens of the device.

Figure 3A:
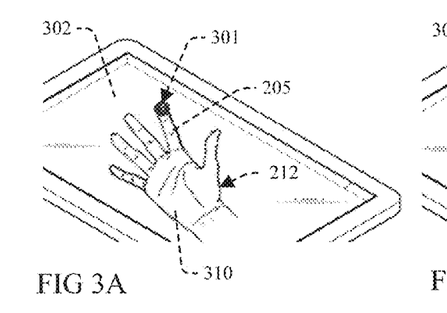
FIGS. 3A, 3B and 3C are graphic illustrations of a sequence used to create a dynamic password via contact with a touchscreen surface in aspects of the present invention.
Figure 3B:
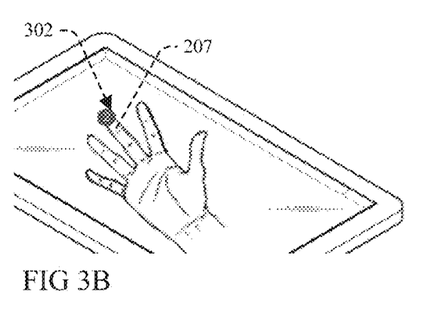
Figure 3C:
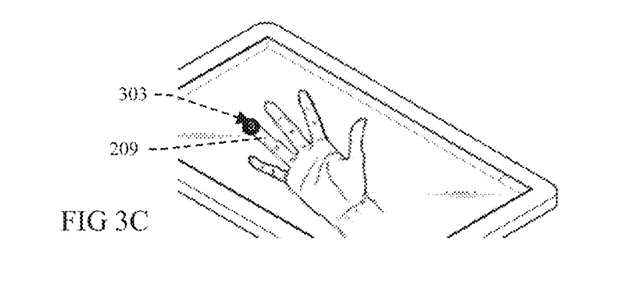

A moving pattern might be defined at 102, 104 and 106 by a user holding a hand in a static position and tapping certain fingers for a given number of times, or at a specified rate, or a rate in compliance with minimum or maximum threshold rates, over a predetermined amount of time (such as three seconds, five seconds, etc.). For example, FIGS. 3A, 3B and 3C depict a sequence used to create a dynamic password via contact with a bottom touchscreen surface 302 in which a hand 310 (viewed through the device screen 302) is held in the "high five" shape 212 of FIG. 2 throughout, and wherein the index finger 205 taps a first contact input 301 onto the touchscreen surface 302 in FIG. 3A, which is followed by the middle finger 207 tapping a second contact input 302 onto the touchscreen surface 302 as shown in FIG. 3B, and which is followed by the ring finger 209 tapping a third contact input 303 onto the touchscreen surface 302 as shown in FIG. 3C. Thus, a dynamic composite touchscreen password pattern component is defined at 102/104/106 that includes "high five" shape screen contact input followed sequentially by the first touch input 301, second touch input 302 and third touch input 303 within a predetermined password setting time period of 106.

Dynamic patterns may have time signatures specified at 108. In one example, executing the pattern successfully may require performing the pattern with no more than maximum specified allowable pauses between the fingertip contact inputs 301, 302 and 303. In another example, executing the pattern successfully may require equivalent or differentiated pause time signatures between the fingertip contact inputs 301, 302 and 303, such as different time intervals between 301 and 302 relative to between 302 and 303 as defined during 106 or specified at 108.

Figure 4:
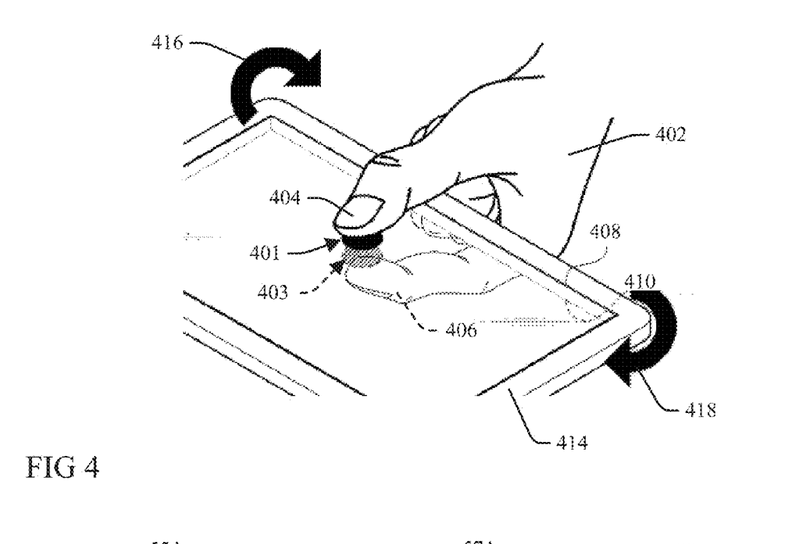
FIG. 4 is a graphic illustration of an engagement of transparent touchscreens to generate a password pattern in aspects of the present invention.

Dynamic patterns may be defined through motion inputs of the device display itself through three-dimensional space during password setting at 106. Thus, a composite pattern may be defined to include motion data generated by motion sensors within the dual-touchscreen assembly (or generated by some other mechanism), wherein the motion data represents the motion of the dual-touchscreen assembly in a first direction defined in a three-dimensional space such as by a specific rotation of the device (for example, clockwise as distinguished from counterclockwise), or in an up or down or side-to-side movement, or a shaking movement, etc. Thus, entry of the composite password will require generation of the same or similar motion data. For example, FIG. 4 shows the thumb 404 of a user hand 402 forming a contact input 401 on a top (first) touchscreen surface 408 of a mobile device 414, while the index finger 406 of the hand 402 forms a contact input 403 on a bottom (second) touchscreen surface 410 of the device 414 immediately there below, and wherein the hand 402 while thereby gripping the device 414 between the thumb 404 and finger 406 rotates the device 414 in an upward fashion indicated by the rotational arrows 416 and 418 during the password setting time at 106. Thus, a dynamic composite touchscreen password pattern may be defined at 102/104/106 as a simultaneous touchscreen input from the contact inputs 401 and 403 that is followed by rotation of the device 414 in the upward fashion indicated by the rotational arrows 416 and 418.

Setting the tolerances or sensitivity for entry of the composite password pattern at 108 may enable recognition of password components that share semantic shape descriptions or attributes while differing in actual contact inputs received by an engaged touchscreen. For example, referring now to FIG. 5, the hand contact pattern 552 is used to define part of the composite password pattern as a right hand engaging a touchpad surface palm 556 down in an open form, with the fingers 554 and thumb 558 each extended outward from the palm 556, and the thumb 558 to the right of the fingers 554. This shape 552 may be semantically described as an "open hand" or "high five" or "number five" shape. Accordingly, and setting the tolerance at 108, may include specifying that the contact pattern defined at 102 or 104 is an "open hand" or "high five" or "number five" shape, in order to enable recognition of a similar shape used to generate dissimilar contact screen inputs as nonetheless satisfying the defined contact pattern in unlocking the device.

Figure 5:
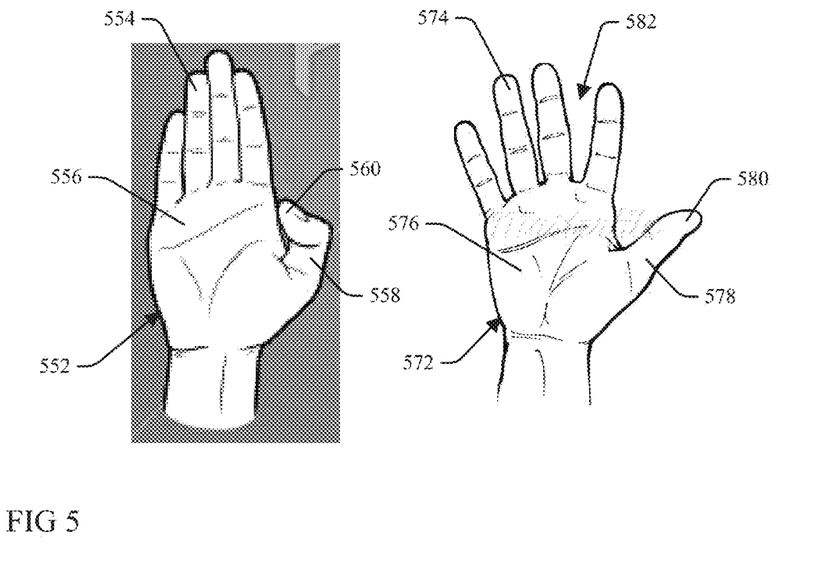
FIG. 5 provides graphic illustrations of hands as used in engaging touchscreens in aspects of the present invention.

The hand shape 572 provides different contact point inputs in engaging a touchscreen relative to the contact point inputs of shape 552, as it has gaps 582 between the fingers 574 that are not present between the fingers 554 of the first hand form 552, and the tip 580 of the thumb 578 extends outward from the palm 576 while the thumb tip 560 is curled inward toward the palm 556 in the original hand form 552. The pattern established by 552 may nonetheless be satisfied by 572 if the sensitivity is set at 108 to determine semantic shapes associated with the contact points of the contact password definitions and subsequent password entries, and recognize that 552 and 572 are categorized as having the same (or similar) "open hand," "high five" or "number five" semantic shape. Thus, aspects of the present invention extend touchscreen password inputs beyond the specific touchscreen inputs to semantic interpretations of the inputs, at a granularity specified by a user or administrator.

Tolerances at 108 may specify a degree of alignment of input of the respective first and second screen patterns of the defined composite pattern password with the mapped location of the defined first pattern on the first screen relative to the location of the defined second pattern on the second screen. For example, with respect to the "35" password example formed from "three" and "five" hand shapes, the tolerance may specify that they be directly aligned above each other, or this alignment may be disregarded and they may be formed at any point on their screens. They may have a specified rotation relative to each, for example with extended index fingers 205 on each shape aligned in the same direction, or rotated 180 degrees from each other, or 90 degrees from each other, and wherein this alignment may form part of the composite password defined at 106.

Tolerances at 108 may specify positioning of certain contact pattern points to enhance security, such as a left finger must always be in a bottom right-hand corner of an engaged touchscreen, even if semantic shape matching criteria is met. Tolerances may specify maximum or minimum distances or differences between contact points established by touching the device in meeting or satisfying an established password contact pattern. For example, a pattern component generated by contact with the "fist" shape 202 centered on one of the screens may be mapped to a location of the contact, and the tolerance set at 108 may specify that successful recreation of the pattern will require that a similar pattern be entered within a minimum displacement from the mapped (centered) location. In another example, the tolerance may be set to disregard location, so that a similar contact pattern indicative of entry by a "fist" shape 202 may be located anywhere on the touchscreen, so long as it is entered with the other contact pattern on the other touchscreen as defined in the composite pattern.

The transparent nature of the back-to-back screens enables additional password definition attributes, wherein a user may be required to not only enter the right composite password patterns but to execute said pattern with one hand (or other contact device) properly aligned with respect to the other when viewed through the screens. Thus, a spatial relationship of one hand to the other while resting upon the transparent screens provides another attribute of the composite password pattern that must be met to unlock the device, one that may only be met through visually aligning the hands or other contact elements on each of the two screens. For example, referring again to FIG. 4, when each is set to a transparent setting, a user may look through the top (first) touchscreen surface 408 and the bottom (second) touchscreen surface 410 to visually align the top screen fingertip contact input 401 directly over the bottom screen fingertip contact input 403, and wherein the created composite password requires this direct corresponding alignment before recognizing the satisfaction of the password by a subsequent rotation of the device 414 as indicated by the rotational arrows 416 and 418.

Figure 6:
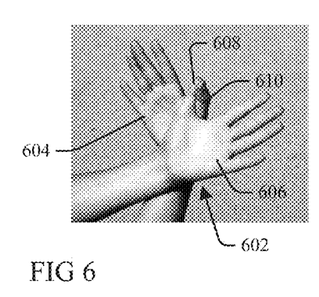
FIG. 6 is a graphic illustration of an arrangement of hands useful in setting or describing passwords in aspects of the present invention.
Figure 7A:
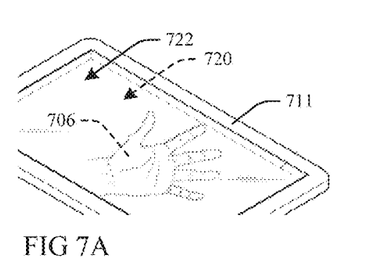
FIGS. 7A and 7B are graphic illustrations of an engagement of transparent touchscreens to generate a password pattern in aspects of the present invention.
Figure 7B:
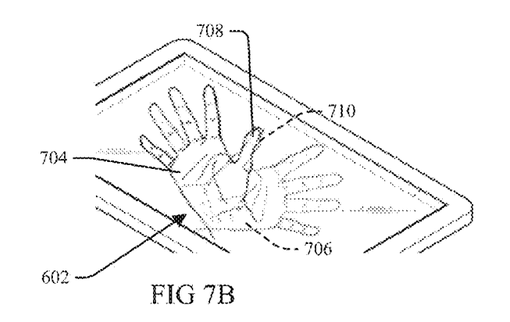

A user may also use both sides of a transparent back-to-back touchscreen assembly to define a composite pattern that has semantic or other meaning when viewed through the transparent screens from the perspective of one of the sides. In one example, a user wishes to define a composite pattern of two hands 604 and 606 overlapping with thumbs 608 and 610 interlocked together, which is readily understood semantically as conveying a "bird shape" 602 as shown in FIG. 6. Accordingly, as shown in FIG. 7A the user places a first (left) hand 706 in contact palm-up with a bottom touchscreen surface 720 of a device 711 with back-to-back touchscreens 720 and 722, wherein the other screen 722 is the top screen from the perspective of FIGS. 7A and 7B. While the screens are set to be transparent, the user aligns his other (right) hand 704 palm up with its back in contact with the top touchscreen surface 722 so that the right hand thumb 708 aligns directly over the left hand thumb 710 that is in contact with the bottom screen 720. Thus, as viewed in FIG. 7B, when each of the screens 720 and 722 are transparent the hands 704 and 706 together form the "bird shape" 602 of FIG. 6. The user may thus set this configuration as the composite password pattern according to the process described above with respect to FIG. 1. More particularly, the password is not met by forming the bird shape 602 with both hands together on either screen, but only when the shape is formed by one hand on one screen 720 and the other hand on the other screen 722 and aligned to form the shape when viewed from a vertical perspective through the top screen 722. Based on tolerance settings to successfully enter the password, the thumbs may have to align over the other with the same orientation as used to define the pattern (for example, with a parallel orientation or crossed at ninety degrees to the other, etc.), or the orientation may vary as long as a thumb contact patterns indicative of the bird shape are input.

In a multiple user environment, two users may also take advantage of transparent back-to-back touchscreen configurations to each provide a touchscreen input that together define a password entry, wherein each user provides one of the touchscreen inputs. For example, in applications using large, transparent back-to-back touchscreens, a first user located on one side may enter one contact pattern while another use located on the other side enters a matching pattern aligned with the first user's contact on the transparent, sandwiched screen assembly to complete an unlocking pattern, such as mating "high five" shapes from opposing hands that meet to form a composite high five with the screen located directly there between.

Figure 8:
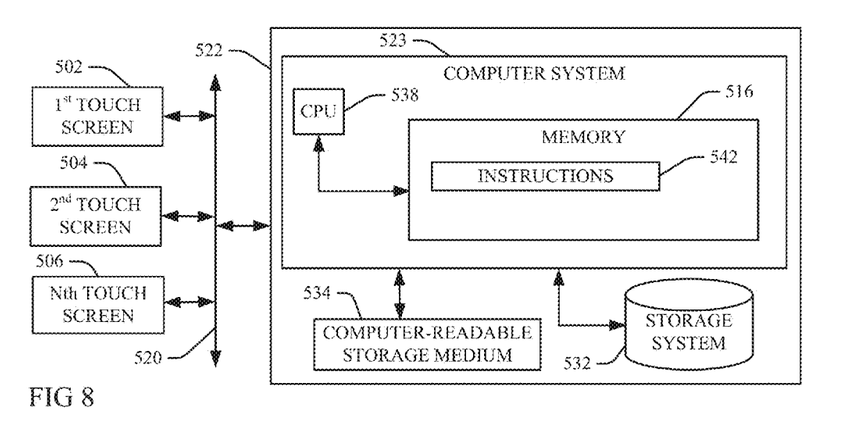
FIG. 8 is a block diagram illustration of a computer system implementation of an aspect of the present invention.

Referring now to FIG. 8, an exemplary computerized implementation of an aspect of the present invention includes a computer system or other programmable device 522 in communication 520 with two, back-to-back transparent first and second touchscreens 502 and 504. (Some aspects may be in communication with additional touchscreens 506.) The programmable device 522 thus provides for password definition and recognition in programmable devices with back-to-back touchscreens as described above with respect to FIGS. 1 through 7B. Instructions 542 reside within computer readable code in a computer readable memory 516, or in a computer readable storage system 532, or other tangible computer readable storage medium 534 that is accessed by a Central Processing Unit (processor or CPU) 538 of a computer system or infrastructure 523 of the programmable device 522. Thus, the instructions, when implemented by the processor 538, cause the processor 538 to define a composite password pattern by mapping locations of the patterns on the first screen relative to locations of patterns on the second screen over a password setting time period, as described above with respect to FIGS. 1 through 7B.

In one aspect, the present invention may also perform process steps of the invention on a subscription, advertising, and/or fee basis. That is, a service provider could offer to integrate computer-readable program code into the computer system 522 to enable the computer system 522 to define a composite password pattern by mapping locations of the patterns on the first screen relative to locations of patterns on the second screen over a password setting time period as described above with respect to FIGS. 1 through 7B. The service provider can create, maintain, and support, etc., a computer infrastructure, such as the computer system 522, network environment 520, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 522, from a tangible computer-readable medium device 532 or 534; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various aspects of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for password definition and recognition in programmable devices with back-to-back touchscreens, the method comprising:
    receiving an input of a first plurality of touchscreen contact inputs that are generated from contact by at least one finger of a hand on a first touchscreen of a programmable device dual-touchscreen assembly that has a second touchscreen located back-to-back with the first touchscreen;
    determining orientation of each of the at least one finger relative to at least one of a palm of the hand and another finger of the hand from the received input of the first plurality of touchscreen contact inputs;
    recognizing a first semantic hand shape of a plurality of different semantic hand shapes that is formed by the determined orientation of each of the at least one finger relative to the at least one of a palm of the hand and another finger of the hand, wherein each of the plurality of different semantic hand shapes have different semantic meanings and are formed by different orientations of at least one finger relative to at least one of another finger and a palm of a hand;
    defining a second contact pattern of touchscreen contact inputs that are generated from contact of a second contact element on the second touchscreen contemporaneously with the received input of the first plurality of touchscreen contact inputs on the first touchscreen, wherein the first and second touchscreens are transparent and enable a viewer to see through each of the first and second touchscreens in the dual-touchscreen assembly; and
    defining a composite password pattern as entry of a third pattern of touchscreen contact inputs that is recognized as forming the first semantic shape at locations on one of the first and second touchscreens contemporaneously with an entry of the second pattern of touchscreen contact inputs on another of the first and second touchscreens at locations in an alignment with the locations of entry of the third pattern of touchscreen contact inputs that is compliant within a sensitivity tolerance of the composite password.

2. The method of claim 1, further comprising:
    integrating computer-readable program code into a computer system comprising a processor, a computer readable memory and a computer readable storage medium, wherein the computer readable program code is embodied on the computer readable storage medium and comprises instructions for execution by the processor via the computer readable memory, that cause the processor to perform the steps of determining the orientation of each of the at least one finger relative to at least one of the palm of the hand and the another finger of the hand from the received input of the first plurality of touchscreen contact inputs, recognizing the first semantic hand shape that is formed by the determined orientation of each of the at least one finger relative to the at least one of a palm of the hand and another finger of the hand, defining the second contact pattern of touchscreen contact inputs that are generated contemporaneously from contact of the second contact element on the second touchscreen, and defining the composite password pattern as the entry of the third pattern of touchscreen contact inputs recognized as forming the first semantic shape at the locations on one of the first or second touchscreen contemporaneously with entry of the second pattern of touchscreen contact inputs on the another of the first and second touchscreens at locations that align within the composite password sensitivity tolerance.

3. The method of claim 1, further comprising:
    recognizing, as a function of the composite password sensitivity tolerance, that the first semantic shape is formed by entry onto one of the first and second touchscreens by either of the first plurality of touchscreen contact inputs and the third pattern of touchscreen contact inputs; and
    wherein locations of contacts onto one of the first and second touchscreens by the first plurality of touchscreen contact inputs and the third pattern of touchscreen contact inputs each define orientations of each of the at least one finger relative to the at least one of the palm of the hand and the another finger of the hand that differ within the composite password sensitivity tolerance.

4. The method of claim 1, further comprising:
    aligning locations of entry of the first plurality of touchscreen contact inputs and the third pattern of touchscreen contact inputs in a visual alignment from a perspective viewed through the transparent first and second touchscreens during the step of defining the composite password pattern, wherein a successful entry of the composite password pattern requires aligning respective contact elements that are used to enter the third pattern on one of the first and second touchscreens contemporaneously with entry of the second pattern on another of the first and second touchscreens in the visual alignment.

5. The method of claim 1, further comprising:
specifying that an alignment of an entry of the third pattern on a touchscreen within a minimum displacement distance from a location of entry on a touchscreen of the first plurality of touchscreen contact inputs satisfies the alignment of the third pattern to the second pattern that is defined in the composite password pattern.

6. The method of claim 1, further comprising:
specifying that an entry of the third pattern at any location on a touchscreen of the first and second touchscreens that is also contemporaneous with an entry of the second pattern on another of the first and second touchscreens satisfies the alignment of the first pattern to the second pattern that is defined in the composite password pattern.

7. The method of claim 1, wherein the second contact pattern of the composite password pattern comprises a dynamic contact input formed by the second contact element touching the second touchscreen at a second contact point located on the second touchscreen, the method further comprising:
defining the composite password pattern to comprise the dynamic contact input at the second contact point located on the second touchscreen, wherein recognizing a successful entry of the composite password pattern requires an entry of the dynamic contact input at the second contact point located on the second touchscreen during entry of the composite password pattern.

8. The method of claim 7, wherein the dynamic contact input comprises at least one of tapping, pinching, squeezing, sliding and touching movements.

9. The method of claim 7, wherein the dynamic contact input comprises motion data generated from movement of the dual-touchscreen assembly in a first direction that is defined in a three-dimensional space during the definition of the first touchscreen that is contemporaneous with the definition of the second contact pattern of the composite password pattern, wherein recognizing a successful entry of the composite password pattern requires an entry of the generated motion sensor data that represents the motion of the dual-touchscreen assembly in the first direction defined in three-dimensional space.

10. The method of claim 7, wherein the dynamic contact input comprises data generated in response to movement of the second contact element to engage different points of touchscreen contact during the step of defining the composite password pattern.

11. The method of claim 10, further comprising:
defining the composite password pattern to comprise time intervals observed between the different engaged points of touchscreen contact.

12. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
determines orientation of each of at least one finger relative to at least one of a palm of the hand and another finger of a hand from a received input of the first plurality of touchscreen contact inputs generated from contact of at least one finger of the hand on a first touchscreen of a programmable device dual-touchscreen assembly that has a second touchscreen located back-to-back with the first touchscreen;
recognizes a first semantic hand shape of a plurality of different semantic hand shapes that is formed by the determined orientation of each of the at least one finger relative to the at least one of a palm of the hand and another finger of the hand, wherein each of the plurality of different semantic hand shapes have different semantic meanings and are formed by different orientations of at least one finger relative to at least one of another finger and a palm of a hand;
defines a second contact pattern of touchscreen contact inputs that are generated from contact of a second contact element on the second touchscreen contemporaneously with the received input of the first plurality of touchscreen contact inputs on the first touchscreen, wherein the first and second touchscreens are transparent and enable a viewer to see through each of the first and second touchscreens in the dual-touchscreen assembly; and
defines a composite password pattern as entry of a third pattern of touchscreen contact inputs that is recognized as forming the first semantic shape at locations on one of the first and second touchscreens contemporaneously with an entry of the second pattern of touchscreen contact inputs on another of the first and second touchscreens at locations in an alignment with the locations of entry of the third pattern of touchscreen contact inputs that is compliant within a sensitivity tolerance of the composite password.

13. The system of claim 12, wherein the processor executes the program instructions stored on the computer-readable storage medium via the computer readable memory, and thereby further:
recognizes, as a function of the composite password sensitivity tolerance, that the first semantic shape is formed by entry onto one of the first and second touchscreens by either of the first plurality of touchscreen contact inputs and the third pattern of touchscreen contact inputs; and
wherein locations of contacts onto one of the first and second touchscreens by the first plurality of touchscreen contact inputs and the third pattern of touchscreen contact inputs each define orientations of each of the at least one finger relative to the at least one of the palm of the hand and the another finger of the hand that differ within the composite password sensitivity tolerance.

14. The system of claim 12, wherein the processor executes the program instructions stored on the computer-readable storage medium via the computer readable memory, and thereby further:
accepts an entry of the third pattern at any location on a touchscreen of the first and second touchscreens that is also contemporaneous with an entry of the second pattern on another of the first and second touchscreens as satisfying the alignment of the third pattern to the second pattern that is defined in the composite password pattern.

15. The system of claim 12, wherein the processor executes the program instructions stored on the computer-readable storage medium via the computer readable memory, and thereby further:
defines the second contact pattern of the composite password pattern to comprise a dynamic contact input formed by the second contact element touching the second touchscreen at a second contact point located on the second touchscreen, wherein recognizing a successful entry of the composite password pattern requires an entry of the dynamic contact input at the second contact point located on the second touchscreen during entry of the composite password pattern.

16. The system of claim 12, wherein the processor, when executing the program instructions stored on the computer-readable storage medium via the computer readable memory, further:
   defines the second contact pattern of the composite password pattern to comprise a dynamic contact input comprising motion data generated from movement of the dual-touchscreen assembly in a first direction that is defined in a three-dimensional space during the definition of the second touchscreen that is contemporaneous with the definition of the second contact pattern of the composite password pattern, wherein recognizing a successful entry of the composite password pattern requires an entry of the generated motion sensor data that represents the motion of the dual-touchscreen assembly in the first direction defined in a three-dimensional space.

17. A computer program product for password definition and recognition in programmable devices with back-to-back touchscreens, the computer program product comprising:
   a computer readable storage medium having computer readable program code embodied therewith, wherein the computer readable storage medium is not a transitory signal, the computer readable program code comprising instructions for execution by a processor, that cause the processor to:
   determine orientation of each of at least one finger relative to at least one of a palm of the hand and another finger of a hand from a received input of the first plurality of touchscreen contact inputs generated from contact of at least one of finger of the hand on a first touchscreen of a programmable device dual-touchscreen assembly that has a second touchscreen located back-to-back with the first touchscreen;
   recognize a first semantic hand shape of a plurality of different semantic hand shapes that is formed by the determined orientation of each of the at least one finger relative to the at least one of a palm of the hand and another finger of the hand, wherein each of the plurality of different semantic hand shapes have different semantic meanings and are formed by different orientations of at least one finger relative to at least one of another finger and a palm of a hand;
   define a second contact pattern of touchscreen contact inputs that are generated from contact of a second contact element on the second touchscreen contemporaneously with the received input of the first plurality of touchscreen contact inputs generated on the first touchscreen, wherein the first and second touchscreens are transparent and enable a viewer to see through each of the first and second touchscreens in the dual-touchscreen assembly; and
   define a composite password pattern as entry of a third pattern of touchscreen contact inputs that is recognized as forming the first semantic shape at locations on one of the first and second touchscreens contemporaneously with an entry of the second pattern of touchscreen contact inputs on another of the first and second touchscreens at locations in an alignment with the locations of entry of the third pattern of touchscreen contact inputs that is compliant within a sensitivity tolerance of the composite password.

18. The computer program product of claim 17, wherein the computer readable program code instructions for execution by the processor, further cause the processor to:
   recognize, as a function of the composite password sensitivity tolerance that the first semantic shape is formed by entry onto one of the first and second touchscreens by either of the first plurality of touchscreen contact inputs and the third pattern of touchscreen contact inputs; and
   wherein locations of contacts onto one of the first and second touchscreens by the first plurality of touchscreen contact inputs and the third pattern of touchscreen contact inputs each define orientations of each of the at least one finger relative to the at least one of the palm of the hand and the another finger of the hand that differ within the composite password sensitivity tolerance.

19. The computer program product of claim 17, wherein the computer readable program code instructions for execution by the processor, further cause the processor to:
   accept an entry of the third pattern at any location on a touchscreen of the first and second touchscreens that is also contemporaneous with an entry of the second pattern on another of the first and second touchscreens as satisfying the alignment of the third pattern to the second pattern that is defined in the composite password pattern.

20. The computer program product of claim 17, wherein the computer readable program code instructions for execution by the processor, further cause the processor to:
   define the second contact pattern of the composite password pattern to comprise a dynamic contact input comprising data generated in response to movement of the second contact element to engage different points of touchscreen contact during the step of defining the composite password pattern, and
   comprising time intervals observed between the different engaged points of touchscreen contact.

* * * * *